United States Patent
Di Noto et al.

(10) Patent No.: US 9,680,180 B2
(45) Date of Patent: Jun. 13, 2017

(54) SOLID-STATE ELECTROLYTES BASED ON FLUORINE-DOPED OXIDES

(75) Inventors: Vito Di Noto, Cadoneghe (IT); Federico Bertasi, Bardolino (IT); Enrico Negro, Treviso (IT); Matteo Piga, Lonigo (IT); Mauro Bettiol, Giavera del Montello (IT); Fabio Bassetto, Monticello Conte Otto (IT)

(73) Assignee: BRETON S.P.A., Castello di Godego (TV) (IT)

( * ) Notice: Subject to any disclaimer, the term of this patent is extended or adjusted under 35 U.S.C. 154(b) by 551 days.

(21) Appl. No.: 14/233,812

(22) PCT Filed: Jul. 11, 2012

(86) PCT No.: PCT/IB2012/053542
§ 371 (c)(1),
(2), (4) Date: Jan. 20, 2014

(87) PCT Pub. No.: WO2013/011423
PCT Pub. Date: Jan. 24, 2013

(65) Prior Publication Data
US 2014/0162137 A1    Jun. 12, 2014

(30) Foreign Application Priority Data
Jul. 21, 2011 (IT) .............................. TV2011A0104

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/0045* (2013.01);
(Continued)

(58) Field of Classification Search
CPC ......... H01M 10/0562; H01M 10/0525; H01M 2300/0074; H01M 10/056;
(Continued)

(56) References Cited

U.S. PATENT DOCUMENTS

| 5,597,515 A | * | 1/1997 | Kauffman | ............. | B82Y 30/00 |
| | | | | | 252/519.12 |
| 2010/0084600 A1 | * | 4/2010 | Ahmad | ................ | G02F 1/1525 |
| | | | | | 252/62.2 |

(Continued)

FOREIGN PATENT DOCUMENTS

| EP | 1088796 A1 | 4/2001 |
| EP | 1443582 A1 | 8/2004 |

(Continued)

OTHER PUBLICATIONS

Czoska, A. M., et al., The Nature of Defects in Fluorine-Doped TiO2, J. Phys. Chem. C (2008), pp. 8951-8956.
(Continued)

*Primary Examiner* — Nicholas P D'Aniello
*Assistant Examiner* — Abibatu Ojo-Amoo
(74) *Attorney, Agent, or Firm* — Fredrikson & Byron, P.A.

(57) ABSTRACT

The use of particles of at least one crystalline oxide, preferably metal oxide, having an average particle size of less than 500 nm and a fluorine content of between 0.5 and 30% by weight, preferably between 0.5 and 5%, even more preferably between 1.0 and 4%, for the preparation of solid-state electrolytes, is described. Also described is a solid-state electrolyte, containing particles of at least one crystalline oxide, preferably metal oxide, having an average particle size of less than 500 nm, preferably between 10 and 500 nm, even more preferably between 50 and 300 nm; a fluorine content as noted above; an alkali or alkaline-earth (Continued)

Figure 1:
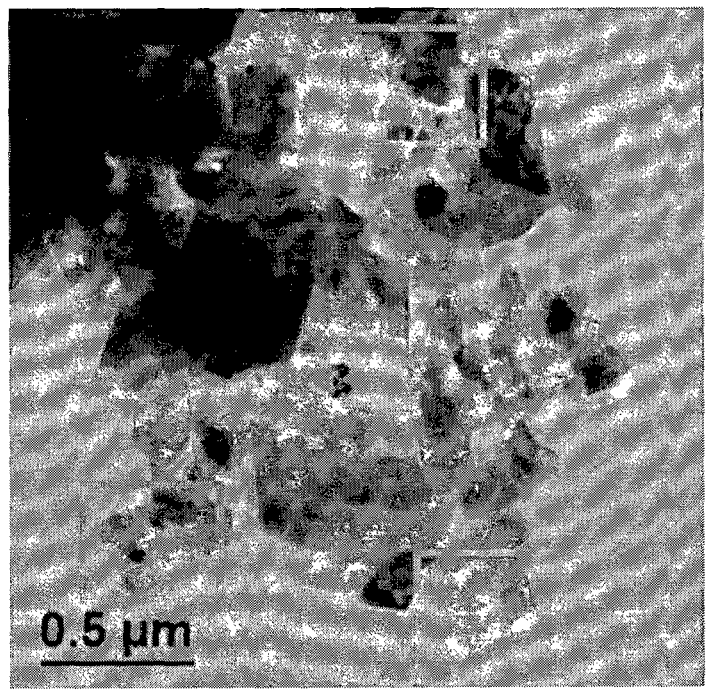

Discharge curve for Li battery with electrolyte LiFFeO-EMImTFSI metal content of between 0.5 and 10% by weight, preferably between 0.5 and 5%, even more preferably between 1 and 4%. Furthermore an inorganic-organic hybrid electrolyte obtainable by means of reaction of the aforementioned solid-state electrolyte with ionic liquids is described.

8 Claims, 11 Drawing Sheets

(52) U.S. Cl.
CPC ............... *H01M 2300/0071* (2013.01); *H01M 2300/0091* (2013.01)

(58) Field of Classification Search
CPC . H01M 2300/0045; H01M 2300/0048; H01M 2300/0065; H01M 2300/0071; H01M 2300/0091
USPC .......................................................... 429/321
See application file for complete search history.

(56) References Cited

U.S. PATENT DOCUMENTS

| 2010/0086854 A1* | 4/2010 | Kumar | H01M 4/505 |
| | | | 429/223 |
| 2010/0111817 A1 | 5/2010 | Taniguchi et al. | |
| 2011/0091514 A1* | 4/2011 | Xie | A61L 2/084 |
| | | | 424/409 |

FOREIGN PATENT DOCUMENTS

| EP | 1926164 A1 | 5/2008 |
| JP | 2010118211 A | 5/2010 |
| WO | 2005090235 A2 | 9/2005 |
| WO | 2006077203 A1 | 7/2006 |
| WO | 2009113045 A2 | 9/2009 |
| WO | 2012017347 A1 | 2/2012 |

OTHER PUBLICATIONS

Galinski, Maciej., et al., Ionic liquids as electrolytes, Science Direct, Electrochimica Acta 51 (2006), pp. 5567-5580.
Gray, Fiona M., Polymer Electrolytes, RSC Material Mongraphs, (1997), pp. 1-30, The Royal Society of Chemistry, Cambridge, United Kingdom.
Li, Di, et al., Fluorine-doped TiO2 powders prepared by spray pyrolysis and their improved photocatalytic activity for decomposition of gas-phase acetaldehyde, Science Direct, Journal of Fluorine Chemistry 126, (2005), pp. 69-77.
Murayama, Masahiro, et al., Synthesis of New Lithium Ionic Conductor Thio-Lisicon—Lithium Silicon Suffices System, Journal of Solid State Chemistry 168, (2002), pp. 140-148.
Knauth, Philippe, Inorganic solid Li ion conductors: An overview, Science Direct, Solid State Ionics 180 (2009), pp. 911-916.
Padhi, A. K., et al., Effect of Structure on the $Fe^{3+}/Fe^{2+}$ Redox Couple in Iron Phosphates, J. Electrochem. Soc., vol. 144, No. 5, May 1997, pp. 1609-1613, The Electrochemical Society, Inc.
Tarascon, J. -M., et al., Issues and challenges facing rechargeable lithium batteries, Nature, vol. 414, Nov. 15, 2001, pp. 359-367, Macmillan Magazines Ltd.
Thackeray, M. M., et al., Lithium Insertion into Manganese Spinels, Mat. Res. Bull., vol. 18, (1983), pp. 461-472, Pergamon Press Ltd.
Todorova, N., et al., Structure tailoring of fluorine-doped TiO2 nanostructured powders, Science Direct, Materials Science and Engineering B 152 (2008), pp. 50-54.
Vincent, C., et al., Rechargeable lithium cells, Modern Batteries 2nd Edition—An Introduction to Electrochemical Power Sources, (1997), pp. 198-242 Butterworth Heinmann, Oxford, United Kingdom.
PCT International Search Report and Written Opinion dated Oct. 18, 2012, from which the instant application is based, 10 pgs.
Italian Search Report and Written Opinion dated Mar. 9, 2012 for related IT Application No. TV20110104, 7 pgs.

* cited by examiner

Image HR-TEM

Detail of HR-TEM image showing the interplanar distances of the nanocrystals of anatase in FT, equal to 2.4 Å.

MIR spectra of FT and LiFT

FIR spectra of LiFT (and as reference titanium dioxide as such not fluorinated)

Conductivity graph of LiFT and LiFFeO

Graph for Log(σ) vs 1/T for FT, LiFT and LiFT-EMImTFSI

Discharge curve for Li battery with electrolyte LiFT-EMImTFSI

Discharge curve for Li battery with electrolyte LiFFeO-EMImTFSI

Image of fluorinated Fe oxide

SOLID-STATE ELECTROLYTES BASED ON FLUORINE-DOPED OXIDES

RELATED APPLICATIONS

This application is a 35 U.S.C. 371 national stage filing from International Application No. PCT/IB2012/053542 filed Jul. 11, 2012 and claims priority to Italian Application No. TV2011A000104 filed Jul. 21, 2011, the teachings of which are incorporated herein by reference.

The invention relates to the production of solid-state electrolytes with ionic conductivity based on fluorine-doped oxides, preferably metal oxides. The electrolytes in question are characterized by conductivity values comparable to those of solid-state electrolytes which are already established and commercially available. The invention relates to the use of a category of inorganic electrolytes with a nanometric morphology based on fluorinated oxides, preferably metal oxides, for the preparation of inorganic-organic solid-state electrolytes with ionic, in particular lithium-ion conductivity, to be used preferably in secondary high-temperature lithium batteries.

PRIOR ART

A battery, also called cell or electrochemical cell, is an electrochemical device which converts the energy released by a chemical reaction into electricity, these being described, for example in Vincent et al., *Modern Batteries An Introduction to Electrochemical Power Sources*, Butterworth Heinmann, Oxford, 1997.

A battery is always composed of two electronic conductors (electrodes) in contact with an ion conductor, called electrolyte. Electrodes may be liquid or solid, as in the case of lithium batteries; similarly, the electrolyte may also be both solid, such as β-alumina, and liquid, as in the majority of commercial devices.

Operation of a battery is dependent on the fact that, on the surfaces separating the electrodes and the electrolyte, the conduction of the charge carriers changes from electronic to ionic, something which can only take place in the presence of electrochemical reactions. Batteries may be classified as primary batteries or secondary batteries, depending on whether the electrochemical discharge reaction is able to occur in one direction or in both directions, respectively.

The demand for and consequent industrialization of lithium batteries are attributable to the high electro-positivity and lightness of lithium which have facilitated the production of high energy density systems. Primary lithium batteries use for the anode metallic lithium, for the cathode inorganic materials (so-called intercalation compounds), of the type $LiCoO_2$, $MnO_2$, $V_2O_5$, which have a structure such that the lithium may penetrate into it, and as electrolyte a solution of a lithium salt (e.g. $LiClO_4$) in a mixture of organic solvents (for example ethylene carbonate and dimethyl ether), as described by Tarascon et. al., *Nature* 414 (2001) 359-367.

In order to overcome the problems of cyclability associated with metallic lithium (caused by passivation defects at the anode/electrolyte interface) secondary lithium-ion batteries have been developed, together with the associated anode and cathode intercalation materials, as described by Thackeray et al., *Material Research Bulletin* 18 (1983), 461-472. A typical cathode intercalation material is $LiCoO_2$ (lithium cobalt oxide); polyoxoanionic compounds with a structure consisting of octahedra of the type $MO_6$, where M=Fe, Ti, V, Nb and tetrahedric anions of the type $XO_4^{n-}$ where X=S, P, As, Mo and W, have been the subject of extensive studies (Padhi et. al, *Journal of the Electrochemical Society* 144 (1997) 1609-1613); of these compounds the most important one is $LiFePO_4$. A typical anode intercalation material is graphite.

The purpose of electrolytes is to allow the passage of charge carriers (such as $Li^+$) from the anode to the cathode; electrolytes must have a number of characteristics:
high ionic conductivity;
broad electrochemical stability range, necessary if cathode materials which are particularly oxidising in relation to $Li/Li^+$ (>4 V) are used;
high thermal stability, necessary for high-temperature batteries.

Electrolytes may be classified in four main categories depending on their physical state (Gray, *Polymer Electrolytes*, RSC Material Monographs, Cambridge, 1997):
1) liquid electrolytes: consisting for example of a solution of a lithium salt dissolved in a solvent (Gali'nsky et al. Electrochimica Acta 51 (2006) 5567-5580). Despite their high conductivity (values of between $10^{-2}$ and $10^{-3}$ S cm$^{-1}$), liquid electrolytes have several drawbacks: they result in losses and corrosion problems, they cannot be used at high temperatures owing to their volatility and finally they greatly restrict miniaturization of the devices;
2) solid-ceramic electrolytes: in which the conductivity takes place owing to movement of load defect points; they are usually used for high-temperature systems and may be classified in three categories of chemical compounds:
a. perovskite oxides (as described by P. Knauth, Solid State Ionics, 180 (2009) 911-916); at present the best Li ion ceramic conductor is based on a lanthanum titanate where, at temperatures not higher than 127° C., the $Li^+$ moves in a solid solution through the lanthanum vacancies;
b. sulphides (materials such as Thio-LISICON, described by M. Murayama et al. Journal of Solid State Chemistry 168(1) (2002)140); and
c. phosphates (materials such as NASICON, described by P. Knauth, op. cit.).
3) solid-glass electrolytes: these consist of amorphous solids which can be obtained by means of liquid cooling; at room temperature the conductivity values range between $10^{-2}$ and $10^{-5}$ S cm$^{-1}$.
4) fused electrolytes: these consist of eutectic mixtures of fused salts and are used in high-temperature Li batteries, such as the mixture LiCl/KCl, the eutectic point of which is at 355° C. The main disadvantage lies in the need to keep the device at a high temperature and the use of very aggressive reagents.

These first four categories of electrolytes considered have a common drawback, namely that they require the use of liquid electrodes, such as fused metals (sodium) or fused salts ($NaS_x$) in order to ensure constant contact between electrodes and electrolyte.

Polymer electrolytes appear to be possible candidates for the production of entirely solid-state devices. This category includes various subassemblies of materials:
a. gel electrolytes, where the lithium salt is dissolved in a polar liquid to which an inert polymer material is then added so as to provide greater stability;
b. plasticized electrolytes in which a liquid with a high dielectric constant is added to a polymer electrolyte in order to improve its conductivity;
c. ionic rubbers, which are obtained by adding a polymer with a high molecular weight to a liquid electrolyte;
d. membranes with ionic conductivity, similar to those used in fuel cells;

e. organic-inorganic hybrid electrolytes. The basic structure of these materials consists in a series of organic macromolecules (for example, polyethylene oxide, PEO) which act as bridges for inorganic species. Examples of organic-inorganic hybrids are 3D-HION-APEs (three-dimensional hybrid inorganic-organic networks as polymer electrolytes), Z-IOPEs (zeolitic inorganic-organic polymer electrolytes) and HGE (hybrid gel electrolytes)

WO2005/090235 and WO2006/077203 describe the production of non-doped titanium dioxide. Fluorine-doped titanium dioxide is described in: Li et al. *Journal of Fluorine Chemistry*, Elsevier, vol. 126, n. 1, 69-77, 2005; Todorova et al. *Material Science and Engineering*, Elsevier, vol. 152, n. 1-3, 50-54, 2008; Czoska et al. *Journal of Physical Chemistry*, vol. 112, 8951-8956, 2008; U.S. Pat. No. 5,597,515; WO 2009/113045.

DESCRIPTION OF THE INVENTION

It has now been surprisingly discovered that it is possible to functionalize particles of a fluorine-doped oxide, preferably metal oxide, even more preferably titanium dioxide or iron oxide, with fused alkali or alkaline-earth metals (for example Li or Na or Mg), in particular lithium. The material which is obtained is functionalized superficially with ions of the abovementioned metal and can be used for the production of a solid-state electrolyte for ion batteries. The oxide, as well as the oxygen element, is formed by at least one metallic element, preferably chosen from among titanium, iron, zirconium, hafnium, tungsten, tantalum, molybdenum, chromium, cobalt, nickel, copper, zinc, aluminium, tin, scandium, yttrium, vanadium, niobium, manganese, germanium, indium, cadmium and lanthanide elements; or by at least one non-metallic element which forms crystalline oxides at room temperature and pressure, for example silicon and phosphorus; or mixtures of the same elements other than oxygen.

In particular, thermogravimetric analyses show that these new electrolytes have a stability of up to 250° C., suggesting that they should be used, for example, in high-temperature lithium batteries, with all the advantages associated with the increased conductivity, the latter being dependent on the kinetically slow diffusion of the lithium.

Unlike conventional solid-state electrolytes, where typically the $Li^+$ ions occupy interstitial sites of a crystal (see LISICON or perovskite materials), in the solid electrolytes according to the present invention, the $Li^+$ ions are located on the surface of sub-micrometric particles of, for example, fluorinated titanium oxide functionalized by means of a process for replacing the proton of hydroxyl groups with lithium ions (processed called lithiation). This therefore results in a solid electrolyte, the conductivity of which is sufficiently high to be used as such (and not for the production of polymer electrolytes). The electrolyte may be optionally made to react with ionic liquids in order to increase its conductivity, thus resulting in a hybrid organic/inorganic element.

One subject of the present invention therefore consists in the use of particles of at least one crystalline oxide, preferably metal oxide, having an average particle size of less than 500 nm, preferably between 10 and 500 nm, and a fluorine content of between 0.5 and 30% by weight, preferably between 0.5 and 5%, even more preferably between 1.0 and 4%, for the preparation of solid-state electrolytes.

A further subject of the present invention consists in the solid-state electrolytes containing or composed of the aforementioned particles.

A further subject of the present invention consists in the inorganic-organic hybrid electrolytes which can be obtained by the reaction of the aforementioned solid-state electrolytes with ionic liquids.

A further subject of the present invention consists in the batteries containing the aforementioned solid-state electrolytes or the aforementioned inorganic-organic hybrid electrolytes.

For the purposes of the present invention, the expression particles of fluorine-doped oxide is understood as meaning particles of said crystalline oxide, preferably metal oxide, having an average particle size of less than 500 nm, preferably between 10 and 500 nm, and containing fluorine, hydroxyl groups, ammonium cations and nitrogen oxides. In the particular case of titanium oxide, the expressions particles of fluorine-doped $TiO_2$, particles of fluorine-doped titanium dioxide or FT are understood as meaning particles of anatase having an average particle size of less than 500 nm, preferably between 10 and 500 nm, even more preferably between 50 and 300 nm, which have fluorine, hydroxyl groups, ammonium cations and nitrogen oxides on their surface.

More particularly said particles are of the "shell-core" type, that is they are formed of an internal core essentially comprising crystalline oxide which is preferably metallic, even more preferably titanium dioxide, in particular anatase, and a surface coating having a mean thickness of between 0.3 and 20 nm, preferably between 0.6 and 10 nm. The surface coating contains fluorine atoms bridging with metal atoms and terminal fluorine atoms; it is also rich in hydroxyl groups, ammonium cations and nitrogen oxides located on the surface of the said coating.

In the particular case of anatase, the coating contains fluorine atoms bridging with titanium atoms and terminal fluorine atoms; it is also rich in hydroxyl groups, ammonium cations and nitrogen oxides located on the surface of the said coating.

The aforementioned particles of fluorine-doped metal oxide and, in particular, the particles of fluorine-doped titanium dioxide, may be obtained with the process described in international patent application WO 2012/017347, incorporated herein by way of reference.

In particular, the process for the production of particles of fluorine-doped oxide, preferably metal oxide, even more preferably fluorine-doped $TiO_2$ and/or $Fe_2O_3$, may comprise the following steps:

(a) a mineral, in particular metallic mineral and, preferably, a titanium and iron mineral is reacted with an aqueous solution of $NH_4HF_2$;

(b) the aqueous dispersion so obtained is filtered with the subsequent separation of a solid residue and an aqueous solution containing titanium salts;

(c) the aqueous solution so obtained is hydrolysed, this hydrolysis comprising a first stage at pH 6.5-8.0 and a second stage at pH 9.0-11.0;

(d) the aqueous dispersion so obtained is filtered and the solid residue is subjected to pyrohydrolysis at a maximum temperature of about 500° C., preferably about 450° C., even more preferably about 350° C.;

(e) optionally the filtrate obtained from step (d) is heated to a temperature of 150-170° C., preferably about 160° C., and kept at that temperature for a time period of 0.5 to 2 hours, with the consequent production of $NH_4HF_2$, which can be recycled to stage (a) once re-dissolved in water.

(f) optionally, the solid residue formed in step (b) is subjected to pyrohydrolysis at a maximum temperature of 500° C., preferably 450° C.

In the case where the oxide is a metal oxide and in particular this metal is titanium, this process involves the extraction of titanium from the mineral ilmenite ($FeTiO_3$), which may possibly be enriched; this extraction takes place within a suitable reactor, causing the mineral to react with a concentrated aqueous solution of between 10% and 37% by weight and preferably about 30% by weight of $NH_4HF_2$ having a pH preferably between 5.5 and 5.7. Chemical analysis of the ilmenite performed using ICP-AES before the start of the reaction with $NH_4HF_2$ has shown that the mineral contains traces (<1% by weight) of Al, Ca, Co, Ni and Zn. 1.1% by weight of W is also present.

The mineral is added to the reactor preferably with an average particle size of 0.05-1.5 mm, even more preferably of about 0.2 mm, and may be preheated to 80-120° C., preferably to about 100° C. It is suggested that the mineral should be added to the bottom of the reactor by means of a system which prevents the gases present within the reactor from rising up through the inlet pipe for the said sand. The aqueous solution of $NH_4HF_2$ is preferably preheated to 50-100° C., preferably to about 80° C.; the ratio by weight between the ilmenite and the $NH_4HF_2$ solution (preferably 30% by weight) is normally between 1:6 and 1:8, and is preferably about 1:7.5.

The reactor has equipment for stirring the ilmenite sand in such a way as to encourage intimate contact between the reagents (ilmenite and solution), in particular in the bottom zone of the reactor. The stirring is possibly such as not to create turbulent motion in the top of the reactor; in the best embodiment, the stirring speed should not exceed 20 rpm, preferably 10 rpm.

The temperature within the reactor is kept at 100-110° C., preferably 104-106° C., and even more preferably at about 105° C., and at a pressure of between about 1 and 2 bar; this may be achieved using the conventional devices known in the art, for example a heating jacket system on the outside of the reactor; in the best embodiment the greatest quantity of heat is transmitted through the bottom part of the reactor, where the concentration of reagents is highest; also, in order to prevent the escape of gaseous compounds into the outside environment, it is recommended that a leaktight reactor should be used. The reaction has a preferred time of 40 to 80 minutes.

The pH within the reactor under these operating conditions is about 6.5-7.0.

Gaseous ammonia is produced by the reaction; this can be conveyed outside the reactor and absorbed in water so as to obtain a concentrated solution (about 24% by weight) of ammonium hydroxide $NH_4OH$, which can in turn be used during the subsequent stages of hydrolysis of the titanium salts. Removal of the ammonia also makes it possible to regulate the pressure within the reactor (normally about 1 bar).

The reaction between $FeTiO_3$ and $NH_4HF_2$ (in aqueous solution) produces two salts: ammonium hexafluorotitanate $(NH_4)_2TiF_6$ and ammonium (ferric) hexafluoroferrate $(NH_4)_3FeF_6$. The titanium salt has a solubility which depends directly on temperature and is inversely dependent on the concentration of $NH_4HF_2$; it therefore remains in solution under the reaction conditions. The iron salt instead has negligible solubility and remains in the form of a solid dispersion.

An aqueous solution of $NH_4HF_2$ and $(NH_4)_2TiF_6$ containing the dispersed $(NH_4)_3FeF_6$ salt is recovered from the reactor. The dispersion leaving the reactor is passed through a filter capable of retaining solid particles having dimensions of between 0.1 and 2.0 μm; this result can be achieved using meshes having holes of 2-3 nm, approximately 2.5 nm. The solid dispersion of the iron salt is separated from the titanium salt solution in this section.

The filtered sludge may be further washed with $NH_4F$ and/or $NH_4HF_2$ solutions and then filtered a second time; these two filtrations may take place within the same filtering equipment.

At the filter outlet the following is obtained:
(a) a solid sludge portion containing principally the iron salt $(NH_4)_3FeF_6$;
(b) an aqueous solution containing the titanium salt $(NH_4)_2TiF_6$, ammonium difluoride ($NH_4HF_2$) and traces of the iron salt $(NH_4)_3FeF_6$, which is a contaminant for the final product.

The solid sludge portion (a) normally has a moisture content of between 10 and 20% by weight depending on the filtering device used. The aqueous solution (b) normally has an iron salt $(NH_4)_3FeF_6$ content of about 0.04-0.06% by weight.

Aqueous solution (b) from the filtration stage is then further purified from the iron salt $(NH_4)_3FeF_6$ in order to reduce its concentration to less than 0.01% by weight, preferably less than 0.001% (understood as the iron salt concentration), which is equivalent to about 2.5 mg/L (2.5 ppm) of Fe ions in solution.

This is brought about by displacing the pH of the solution to 6.5-8.0, preferably to 7.0-8.0 and even more preferably to 7.0-7.5 by adding concentrated ammonium hydroxide ($NH_4OH$) solution (about 24% by weight); this operation results in the formation of an insoluble ammonium oxyfluorotitanate $[(NH_4)_3TiOF_5)]$ which precipitates out incorporating the residual iron salt $(NH_4)_3FeF_6$.

The operation is performed within a reactor at a temperature of 50-70° C., preferably about 60° C., with stirring; the rate of stirring is normally 40-90 rpm, preferably about 50 rpm; the quantity of $NH_4OH$ to be added is regulated by keeping the pH in the outflow from the vessel at the preferred value of 7.0-8.0, and even more preferably 7.5-8.0.

The dispersion is filtered, yielding an aqueous solution of the titanium salt $(NH_4)_2TiF_6$, further purified from compounds containing iron, and a sludge containing the titanium complex and the iron salt $(NH_4)_3FeF_6$.

The sludge may be dissolved again inside a further vessel provided with stirring for acidification; this takes place through the addition of a concentrated $NH_4F$ and/or optionally $NH_4HF_2$ solution (approximately 40-50% by weight) to a pH of approximately 6.5-7.0; in this way the titanium salt becomes soluble again, forming $(NH_4)_2TiF_6$. The solution/dispersion so obtained is then recycled in addition to the outflow from the main reactor.

This solution/dispersion contains both the soluble titanium salt $(NH_4)_2TiF_6$ and the insoluble iron salt $(NH_4)_3FeF_6$ which has been incorporated by the ammonium oxyfluorotitanate as it precipitates out. This makes it possible to recover both metals completely without producing any waste.

The purified solution, which contains the titanium salt $(NH_4)_2TiF_6$, $NH_4F$ and water, is then subjected to further hydrolysis.

The further hydrolysis is performed in a reactor provided with stirring (approximately 10 rpm), maintaining a temperature of 50-70° C., preferably about 60° C. The reaction takes place by raising the pH of the solution to very high values, preferably 9-11 and even more preferably approximately 10-11 (monitoring the outflow from the reactor); this result is obtained by adding a concentrated solution of ammonium hydroxide $NH_4OH$ (approximately 24% by weight); this ammonium hydroxide solution is preferably used in a large excess amount compared to that required for the reaction.

The further hydrolysis causes precipitation of a mixture of hydrated titanium salts and oxides $(NH_4)_2TiOF_4 + (NH_4)_3TiOF_5 + TiO_2 \cdot nH_2O$ in the form of particles having dimensions of about 0.01 μm. As a consequence an aqueous solution of $NH_4F$ with a dispersed solid comprising salts which can be filtered out is produced in the hydrolysis reactor.

The dispersion so obtained is then filtered through a filter having extremely fine meshes (2-3 nm, preferably about 2.5 nm).

The solution leaving the filter, which contains $NH_4F$, water, excess ammonia and traces of titanium salts, is preferably treated to obtain solid $NH_4HF_2$ so that it can be reused in the stage of reacting with the ilmenite. In order to perform this operation, the solution is preferably heated to boiling in the presence of very slight negative pressure (10 to 60 mm of Hg) with the release of ammonia; the temperature is then raised to 150-170° C. and kept there for at least 60 minutes (still under negative pressure), preferably for 60-120 minutes, with consequent decomposition of the $NH_4F$ salt into $NH_4HF_2$ and ammonia, with the latter being drawn off. After this operation a solid salt is present in the bottom of the reactor and this is dissolved in water to yield a solution of 10% to 37% by weight, preferably about 30% by weight, having a pH of 5.5-5.7.

The sludge part leaving the filter, which normally has a water content of between 10 and 20% by weight depending on the filtering device, is subjected to a pyrohydrolysis process. In more detail, after drying to the point where water is removed, the sludge containing the titanium salts undergoes pyrohydrolysis at a maximum temperature of 500° C., preferably at a maximum temperature between 330 and 470° C. and even more preferably between 350 and 450° C., being kept at the maximum temperature for a time period of 1-3 hours, preferably about 2 hours; this normally takes place in a furnace in an atmosphere of superheated steam; the maximum temperature is reached gradually, preferably with a gradient of 3-6° C./minute, even more preferably 5° C./minute.

With this step of the process it is possible to obtain particles of titanium dioxide according to the present invention; they are characterized by an average particle size of less then 500 nm and a fluorine content of between 0.5 and 5% by weight, preferably between 1.0 and 4%.

The solid sludge part (a) may also undergo a pyrohydrolysis process. In greater detail, the sludge containing the iron salts, after drying until the water is eliminated, undergoes pyrohydrolysis at a maximum temperature of 500° C., preferably, at a maximum temperature of between 330 and 470° C., even more preferably between 350 e 450° C., preferably being kept at the maximum temperature for a time period of 0.5-3 hours, even more preferably of about 1 hour; this is normally performed in a furnace with a super-heated water vapour atmosphere.

With this step of the process it is possible to obtain particles of iron oxide ($Fe_2O_3$) according to the present invention; they are characterized by an average particle size of less then 500 nm and a fluorine content of between 5 and 20% by weight, preferably between 7 and 15%.

The gaseous compounds extracted from the furnace containing $NH_3$, HF, $H_2O$ are normally cooled and absorbed in water to obtain a concentrated solution of $NH_4F$ and/or $NH_4HF_2$ which can easily be recycled and reused to charge the reactor. It is recommended that the gases should not be cooled below 200° C. before being absorbed in water, to prevent the formation of $NH_4F$ and/or $NH_4HF_2$ crystals with consequent obstruction of the tubing.

Under these conditions, if the metal is iron or titanium, all the ammoniacal fluorine bonds are broken, yielding a powder product comprising precisely particles of fluorine-doped $TiO_2$ or $Fe_2O_3$, respectively.

The characteristics shown below refer to particles of fluorine-doped $TiO_2$ according to the present invention:

Analysis by HR-TEM (High-Resolution Transmission Electron Microscopy) reveals the sub-micron morphology of the FT powders. In particular the particles are shown to have a polydisperse size distribution and are present either as regular shapes with sharp edges or irregular smaller-size shapes. Measurement of the interplanar distances for both types of particles reveals the presence of nanocrystals of anatase having dimensions of less than 500 nm (see FIGS. 1 and 2).

Figure 3:
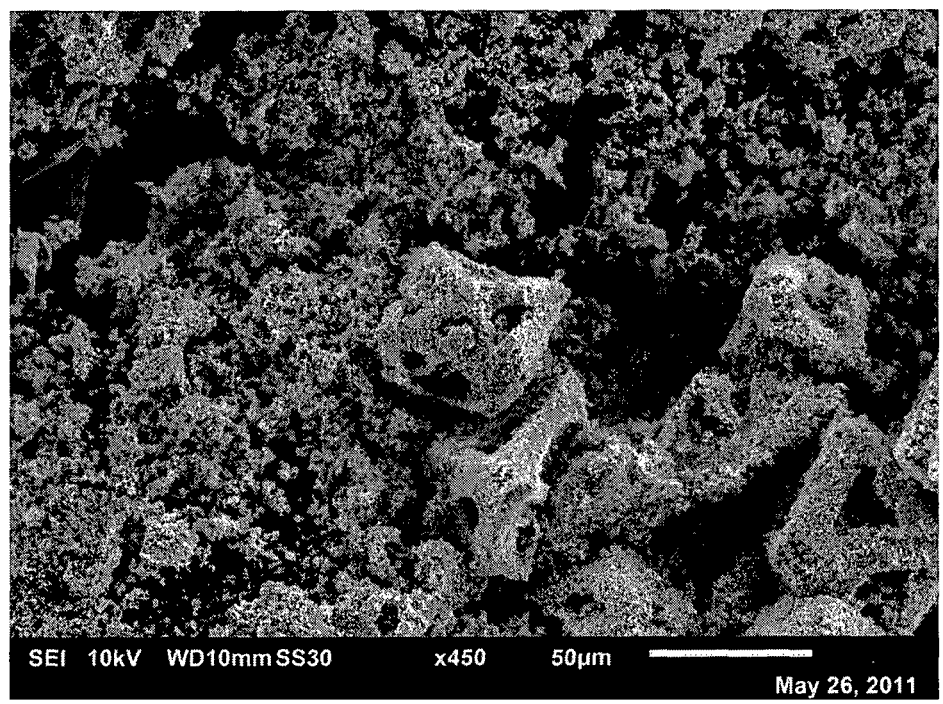
Figure 4:
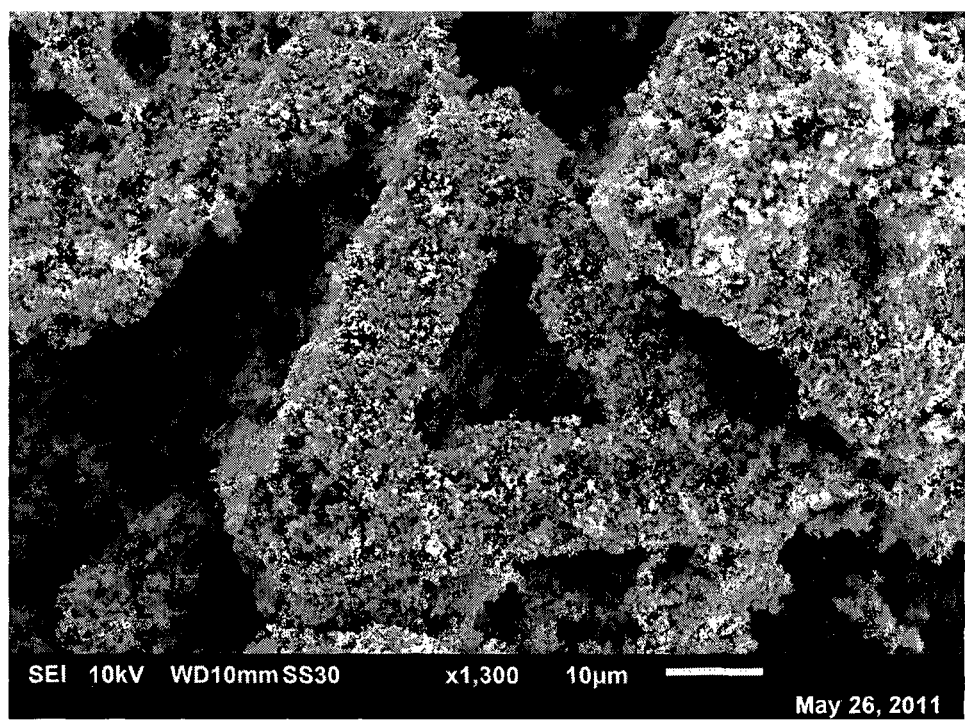

Scanning electron microscope (SEM) analyses carried out using an acceleration voltage of 10 kV and a standard secondary electron detector showed that some of the particles have aggregated to form globular masses while some have aggregated to form internally hollow octahedral structures having edges with a length variable between 40 and 60 μm, preferably of about 50 μm (see FIGS. 3 and 4).

Element analysis using SEM with energy dispersion microanalysis (SEM-EDS) revealed a quantity by weight of fluorine (with respect to the total mass of the particles) of between 0.5 and 5% by weight, preferably between 1.0 and 4% by weight.

Surface element analysis by means of XPS (X-ray Photoelectron Spectroscopy) revealed a quantity of fluorine of between 9% and 30% molar with respect to the titanium, which is approximately equivalent to a weight fraction of fluorine of between 1.5 and 9% by weight, preferably between 2.1 and 6.8% by weight. The latter values are slightly greater than those obtained using the scanning electron microscope (SEM), an indication that the crystalline structures which are richer in fluorine and other elements (nitrogen and hydroxyl groups) are located on the surface.

Element analysis revealed a quantity of nitrogen of between 0.2 and 8% by weight, preferably between 0.3 and 7.5%, even more preferably between 2.5 and 7%, and a quantity of hydrogen between 0.05 and 4% by weight, preferably between 0.08 and 3%, even more preferably between 1.5 and 2.5% (the percentages are expressed in relation to the total mass of the particles); the presence of hydrogen was associated with the surface hydroxyl groups, while the nitrogen was associated with ammonium groups, $NH_4$, and nitrogen oxides, $NO_R$, above all on the surface.

Chemical analysis of the particles performed using ICP-AES showed that they contain traces (<1% by weight) of Ca, Co, Fe, K, Mg, Nb, Ni, W, Si and Zn;

X-ray diffraction (XRD) investigations confirmed that the FT particles are made up of a single crystalline phase—anatase—without amorphous traces or traces of the onset of transition to rutile. No structural modification due the presence of the fluorine was noted from the XRD spectrum of the FT powders and it can therefore be assumed that this is present only on the surface of the FT particles.

From all the investigations it follows that the particles are nanocrystals of titanium dioxide containing fluorine, preferably anatase, said nanocrystals being characterized in that the fluorine is mainly present on their surface and that its concentration decreases gradually away from the surface, that is as the centre of the crystal is approached.

Figure 12:
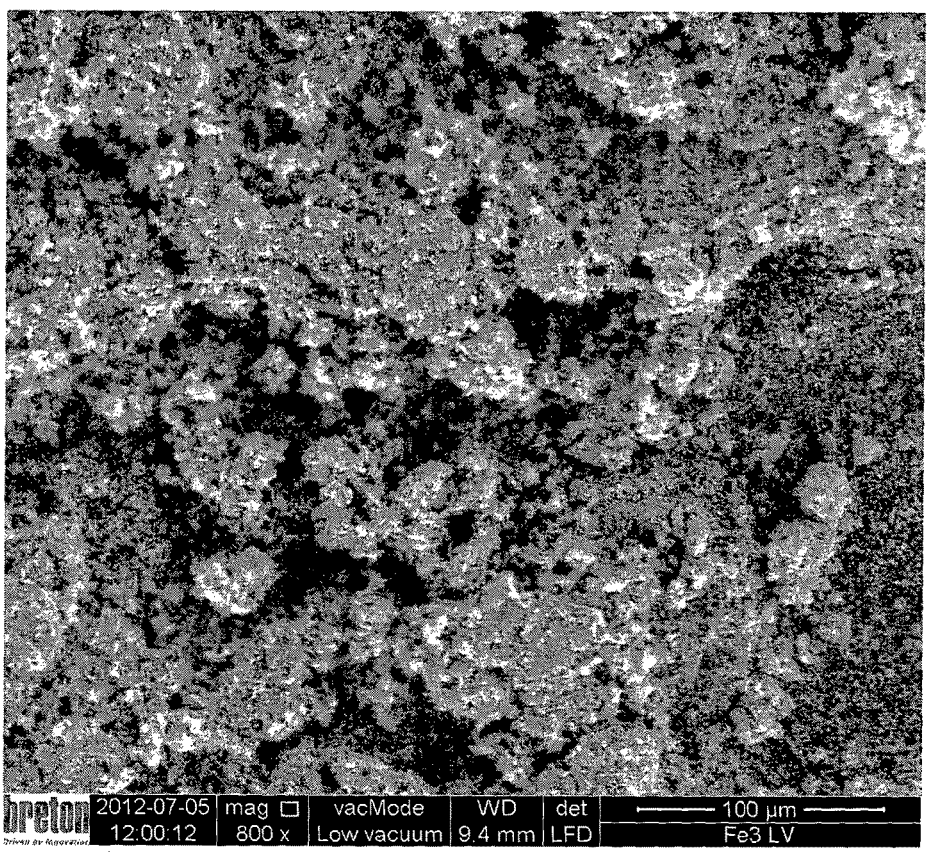

The characteristics shown below refer to the particles of $Fe_2O_3$ doped with fluorine according to the present invention:

The scanning electron microscope (SEM) analyses carried out using a 10 KV acceleration voltage and the standard secondary-electron detector showed that some of the particles have aggregated to form globular masses (see FIG. 12).

Element analysis using SEM with energy dispersion microanalysis (SEM-EDS) revealed a quantity by weight of fluorine (in relation to the total mass of particles) of between 1 and 30% by weight, preferably between 5 and 20% by weight.

Element analysis revealed a quantity of nitrogen of between 0.1 and 2% by weight, preferably between 0.15 and 1.7%, even more preferably between 0.2 and 1.5%, and a quantity of hydrogen between 0 and 2% by weight, preferably between 0 and 1.5%, even more preferably between 0 and 1.25% (the percentages are expressed in relation to the total mass of the particles). One aspect of the invention is therefore represented by the fact that the fluorine (or the fluorine atoms) is essentially present on the surface of the particles; in other words at least 80% of the fluorine, preferably at least 90%, is present on a surface layer of the particles, said surface layer having a mean thickness of between 0.3 and 20 nm, preferably between 0.6 and 10 nm.

The investigations performed also show that the fluorine atoms either form bridges between titanium atoms or are terminal.

Hydroxyl groups as well as ammonium cations and nitrogen oxides are also present on the surfaces of the particles.

The "shell-core" structure of the particles, that is the surface location of the fluorine and the hydroxyl groups, has a significant part to play for the purpose of using these in the production of solid-state electrolytes.

A first subject of the present invention therefore consists in the use of particles of an oxide, preferably metal oxide, doped with fluorine and in particular particles of titanium dioxide and/or iron doped with fluorine, for the preparation of solid-state electrolytes and, in particular, solid-state electrolytes for ion batteries.

In particular the present invention relates to the use, for the preparation of solid-state electrolytes, of particles of an oxide, preferably metal oxide, doped with fluorine having an average particle size of less than 500 nm, preferably between 10 and 500 nm, and a fluorine content of between 0.5 and 30% by weight, preferably between 0.5 and 5%, even more preferably between 1.0 and 4.0% (the percentages are expressed in relation to the total mass of the particles).

More particularly the present invention relates to the use, for the preparation of solid-state electrolytes, of particles of titanium oxide having an average particle size of less than 500 nm, preferably between 10 and 500 nm, and even more preferably between 50 and 300 nm, a fluorine content of between 0.5 and 30% by weight, preferably between 0.5 and 5% and even more preferably between 1.0 and 4.0%.

According to a further aspect of the invention, said particles have a nitrogen content of between 0.2 and 8% by weight, preferably between 0.3 and 7.5%, even more preferably between 2.5 and 7%, and/or a hydrogen content of between 0.05 and 4% by weight, preferably between 0.08 and 3%, even more preferably between 1.5 and 2.5%.

The solid-state electrolyte is preferably prepared by reacting the aforesaid particles in the anhydrous state with an alkaline-earth or alkali metal, preferably lithium, in the fused state. Said metal in the fused state is preferably used in excess with respect to the particles; preferably the metal is used in a quantity of between 1000 and 0.5 parts by weight to one part by weight of particles, even more preferably in quantities of between 50 and 1 part by weight to one part by weight of particles.

According to one aspect of the present invention, the solid-state electrolyte may be prepared using a process which comprises the following steps:

i) The particles of fluorine-doped metal oxide are dried at a temperature of at least 90° C., preferably between 95 and 105° C.; drying is performed possibly under a vacuum, preferably at a pressure of $10^{-1}$ mbar, even more preferably between $2\times10^{-1}$ and $0.5\times10^{-1}$ mbar; preferably it is performed for 48-96 hours, even more preferably for about 72 hours.

ii) The dried particles are reacted with the fused metal in a large excess amount, preferably between 0.5 and 1000 parts by weight, even more preferably between 1 and 50 parts by weight, in an inert gas, preferably argon atmosphere; the reaction is performed at a temperature higher than or the same as the metal fusion temperature, preferably higher by 10-30%; in the case of lithium the reaction is performed at a temperature of between 200 and 240° C., preferably at about 220° C. The mixture of particles and fused metal is kept at this temperature for 1-3 hours, preferably for about 2 hours.

iii) The mixture is then left to cool at room temperature, i.e. a temperature preferably between 20 and 25° C., with consequent solidification of the unreacted excess metal.

iv) The solid thus obtained is then washed with alcohol, preferably an alcohol $C_1$-$C_4$, even more preferably ethanol, in order to remove the unreacted excess metal. Preferably 10 to 100 volumes of alcohol (ml) per parts by weight of solid (g), even more preferably 10 to 50 volumes of alcohol per parts by weight of solid, are used. Filtration is then performed in order to separate the liquid phase from the solid phase.

v) The solid phase thus obtained is dried at a temperature of at least 90° C., preferably between 95 and 105° C., possibly under a vacuum, preferably at a pressure of $10^{-1}$ mbar, even more preferably between $2\times10^{-1}$ and $0.5\times10^{-1}$ mbar; preferably it is performed for 12-36 hours, even more preferably for about 24 hours.

In particular, during the reaction between the fluorine-doped titanium dioxide particles and the fused lithium, it can be noted that the particles of oxide change colour, while maintaining the appearance of a powder. The evolution of the reaction was monitored by means of infrared (IR) spectroscopy which showed that the lithium ions salify the surface hydroxyl groups of the fluorinated oxide and moreover new signals due to the O—Li bonds appeared. As regards the $TiO_2$, the MIR (mid-infrared) spectra shown in FIG. 5 revealed that the typical signals of the hydroxyl groups (between 2500 and 3500 $cm^{-1}$) present in FT after lithiation disappear, while the groups attributed to the nitro groups (at 1400 $cm^{-1}$) underwent a modification which may be attributed to their possible salification and, in any case, is symptomatic of a modification in the surface structure of the particles.

Figure 6:
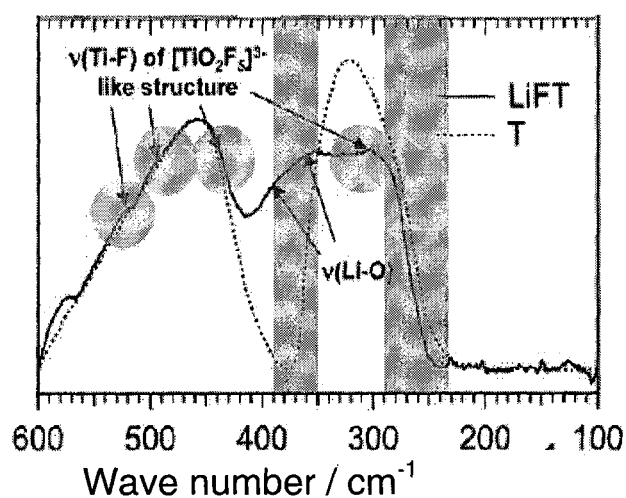

Still with regard to the $TiO_2$, FIG. 6 shows the FIR (far infrared) spectrum showing the signals at 388 and 357 $cm^{-1}$ attributed to stretching of the Li—O bond which confirms that the lithiation reaction of the hydroxyl groups has occurred.

The reaction of the lithiation of fluorine-doped titanium dioxide particles may be represented diagrammatically as follows.

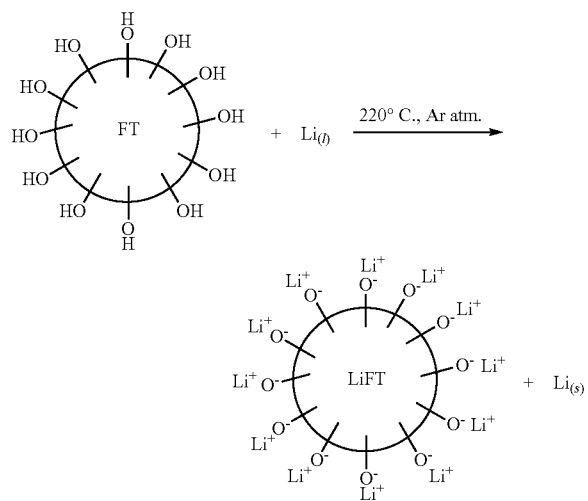

As can be seen, the reaction leads to the formation of particles bearing alkali or alkaline-earth metal cations on their surface, in the case in question $Li^+$. The new compound will be indicated below as LiFT.

These particles, owing to the presence of the aforementioned cations, may be used as solid-state electrolytes to be used in batteries, preferably secondary lithium high-temperature batteries. Unlike conventional solid-state electrolytes, where typically the lithium ions occupy interstitial sites of a crystal (see LISICON or perovskite materials), in the case in question the lithium ions are located on the surface; the ionic conductivity mechanism is therefore attributable to hopping processes of the Li+ on the surface of the particles.

The particles of crystalline oxide, preferably metal oxide, even more preferably titanium dioxide and/or iron oxide obtained by means of the aforementioned salification process with alkali or alkaline-earth metals and which therefore form a further subject of the present invention, also have an average particle size of less than 500 nm, preferably between 10 and 500 nm, even more preferably between 50 and 300 nm. They have a fluorine content of between 0.5 and 30% by weight, preferably between 0.5 and 5%, even more preferably between 1 and 4%; a content of alkali or alkaline-earth metal, preferably lithium, of between 0.5 and 5% by weight, preferably between 1 and 4%; a nitrogen content of between 0.2 and 8% by weight, preferably between 0.3 and 7%; and/or a hydrogen content of between 0.1 and 0.5% by weight, preferably between 0.15 and 0.4% (the percentage amounts are expressed in relation to the total mass of the particles).

In particular, the electrolyte may be used as such or may be reacted with ionic liquids in order to increase the conductivity thereof, thus obtaining a hybrid inorganic-organic electrolyte.

The ionic liquids are salts with fusion temperatures which are so low as to be liquid at room temperature, that it at a temperature of between 20 and 25° C., as for example described in Gali'nski et al., *Electrochimica Acta*, 51 (2006) 5567-5580, incorporated herein by way of reference.

The ionic liquids which may be used for the purposes of the present invention include those which can be obtained from the cations imidazolium, ammonium, pyridinium, piperidinium, pyrrolidinium, sulfonium and colinium, such as for example 1-ethyl-3-methylimidazolium [EtMeIm]$^+$, trimethyl propyl ammonium [TMePrA]$^+$, N-methyl-N-propylpyridinium [MePrPi]$^+$, N-methyl-N-propylpiperidinium [MePrPp]$^+$, 1-butyl-1methylpyrrolidinium [BuMePi], triethyl-sulfonium, colinium acetate and from the anions bistrifluoromethyl-sulfonyl imide tetrafluoroborate [BF$_4$]$^-$, hexafluorophosphate [PF$_6$]$^-$.

The preferred ionic liquids for the purposes of the present invention are:

1-ethyl-3-methylimidazolium (EMIm$^+$) with the anion N,N-bis(trifluoromethane)sulfonyl imide (TFSI$^-$), indicated as EMImTFSI;

and EMIm$^+$ with the anion tetrafluoroborate [BF$_4$]$^-$, indicated as EMImBF$_4$.

The reaction with the ionic liquids is performed by mixing, preferably in a ball mill, 20 to 1 parts by weight of particles of fluorinated oxide functionalized with an alkali or alkaline-earth metal, preferably from 8 to 2 parts by weight, with one part by weight of ionic liquid. The reaction is performed preferably at room temperature, that is at a temperature of between 20 and 25° C., in an inert gas, preferably argon atmosphere. Preferably it is performed for 0.5 to 2 hours, even more preferably for 1 hour.

LiFt reacted with EMImTFSI produces the compound LiFT-EMImTFSI.

The advantages arising from the present invention will become clear from the following examples which are intended for illustration and do not limit the invention itself.

Figure 8:
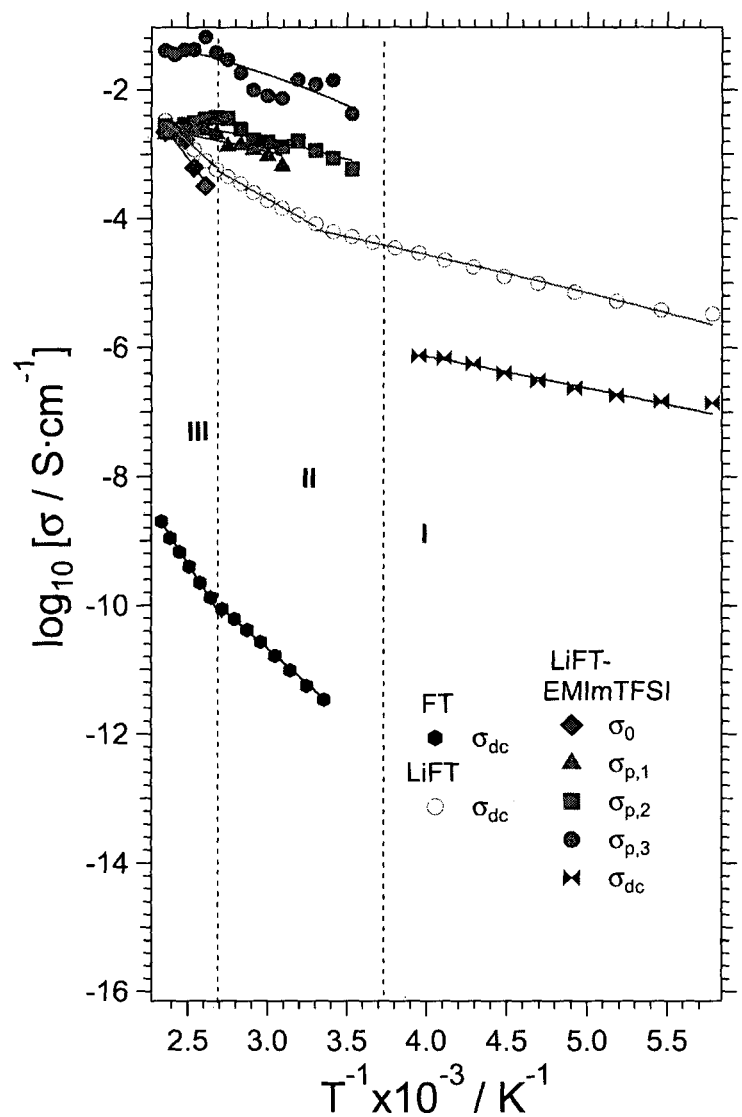

FIG. 8 shows for FT, LiFT and LiFT-EMImTFSI the electrical conductivity values as obtained from broadband dielectric spectroscopy (BDS) and shows that, for the same temperature, the electrical conductivity (expressed along the y axis as log σ) follows this scale LiFT-EMImTFSI>LiFT>FT.

EXAMPLES

Example 1

Preparation of Fluorine-Doped TiO$_2$ 7 liters of water, 3 kg of NH$_4$HF$_2$ salt and 1341 g of ilmenite sand sieved to a particle size of less than 200 microns were placed in a stirred reactor having a volume of approximately 10 liters. The mixture was then brought to boiling at atmospheric pressure, and kept there for approximately 1 hour. After this stage of reaction with the mineral, 4 liters of solution were drawn off through the valve in the bottom of the reactor and then filtered. 1.5 liters of a 30% concentrated solution of ammonia was added to the solution filtered in this way containing the titanium and iron fluoride salts, thermostatted to 70° C., increasing the pH to 7.3. The white precipitate was separated out by filtration and a further 2 liters of a 30% concentrated solution of ammonia were added to the filtrate to obtain a pH of around 9.5. The white precipitate subjected to the subsequent stage of pyrohydrolysis was separated out by filtration. Approximately 30 g of this wet intermediate (moisture content approximately 20%) were placed in an aluminium tube. The tube was inserted into a furnace chamber. It was then heated as follows: 5° C./min up to 450° C. and kept there for 2 hours. Slow cooling followed. Approximately 20 g/min of steam were fed to the tube during the entire test until it ceased to remain at high temperature. The final powder was yellow in appearance and not agglomerated, being composed of anatase doped with approximately 1.2% by weight of fluorine and referred to below as FT (fluorinated titania).

Example 2

Preparation of Fluorine-Doped $Fe_2O_3$ 7 liters of water, 3 kg of $NH_4HF_2$ salt and 1341 g of ilmenite sand sieved to a particle size of less than 200 microns were placed in a stirred reactor having a volume of approximately 10 liters. The mixture was brought to boiling at atmospheric pressure, and kept there for approximately 1 hour. After this stage of reaction with the mineral, the cloudy solution thus formed was filtered so as to separate the solid consisting mainly of $(NH_4)_3FeF_6$. The precipitate was dried and ground so as to form the iron oxide intermediate. Approximately 30 g of this intermediate were placed in an aluminium tube. The tube was inserted into a furnace chamber. It was then heated as follows: 5° C./min up to 450° C. and kept there for 1 hour. Slow cooling followed. Approximately 20 g/min of steam were fed to the tube during the entire test until it ceased to remain at high temperature. The final powder was rusty red in appearance and not agglomerated, being composed of iron oxide doped with approximately 30% by weight of fluorine and indicated below as FFeO (fluorinated iron oxide).

Example 3

An aliquot of FT obtained as in Example 1 was dried under vacuum for 72 hours at 100° C. and $10^{-1}$ mbar.

Example 4

2 g of FT obtained as in Example 2 were reacted with a large excess of fused lithium at 220° C. using an isomantle and mixing constantly. The reaction was performed in a crucible under an atmosphere of argon (oxygen and water<1 ppm). FT and fused lithium metal were reacted for 2 hours. During the course of the reaction it was noted that the fluorinated titania changed colour from straw yellow to blue, retaining the appearance of a powder. The product was copiously washed (total 700 ml) with ethanol, obtaining the final product known as LiFT. ICP-AES analyses revealed that the LiFT had the following composition Ti 33.8%, C 0.30%, N 0.37%, H 0.26% Li 1.34% and O 62.73% and SEM-EDS showed the fluorine content to be approximately 1.2% by weight.

Example 5

Comparative Conductivity Measurements

Using the same process described in Example 4 for the preparation of FT, LiFFeO which constitutes the fluorinated Fe oxide after treatment with molten Li is obtained. The ICO analysis revealed the presence of 2.7% by weight of Li: this percentage is on average double that of LiFT. Further analyses revealed the following composition of LiFFeO: C 0.26%, N 0.01%, Li 2.7%

Figure 7:
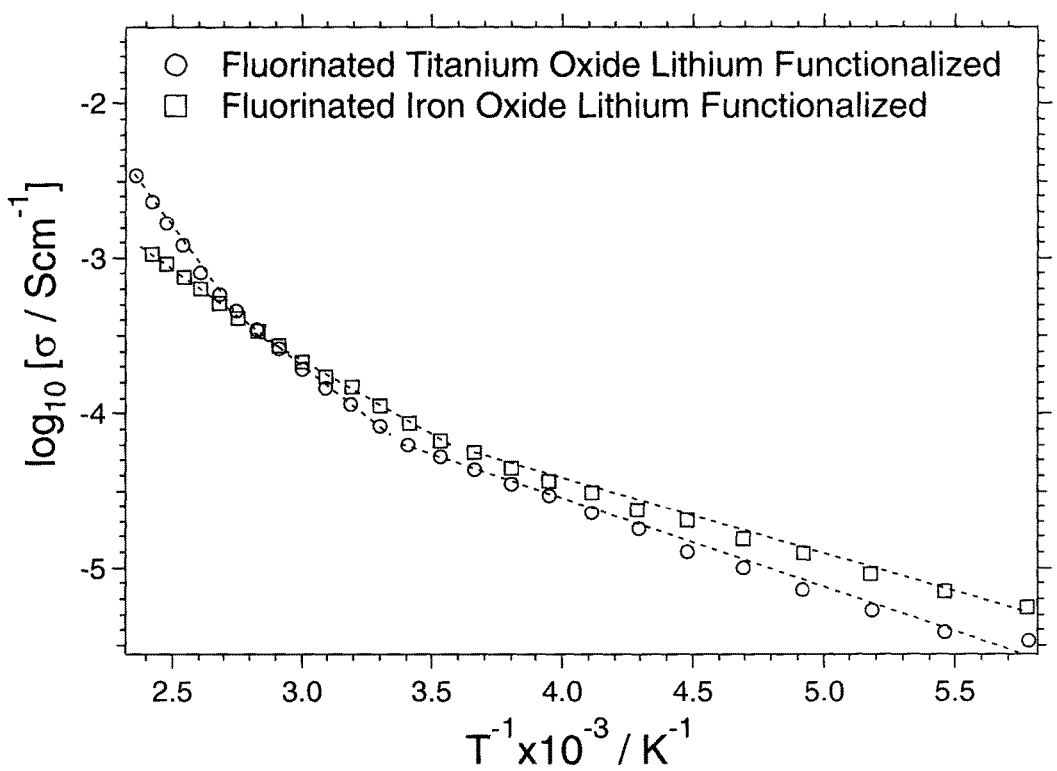

The graph showing the conductivity of LiFT and LiFFeo measured in the temperature range −100 to 150° C. is shown in FIG. 7. Below the conductivity values at certain characteristic temperatures are listed:
Conductivity @ 30° C. $1.12 \times 10^{-4}$ $Scm^{-1}$
Conductivity @ 100° C. $5.09 \times 10^{-4}$ $Scm^{-1}$
Conductivity @ 140° C. $1.06 \times 10^{-3}$ $Scm^{-1}$ Comparing the progression of the conductivity values it can be noted that: a) the conductivity of LiFFeO is greater at the low temperatures compared to LIFT; b) at high temperatures the conductivity of LIFT is greater than Li FFeO.

Example 6

352.5 mg of LiFT obtained as in Example 4 are reacted with 88.1 mg of EMImTFSI (25% by weight) in a ball mill under an argon atmosphere for 1 hour. In this way thorough mixing between LIFT and EMImTFSI is obtained, this ensuring adsorption of the ionic liquid on the surface of the titanium dioxide and allowing ion exchange between the $Li^+$ ion and the imidazolium cation. The electrolyte LiFT-EMImTFSI is thus obtained.

Example 7

320.2 mg of LiFT obtained as in Example 4 are reacted with 80 mg of $EMImBF_4$ in a ball mill under an argon atmosphere for one hour. In this way thorough mixing between LiFT and $EMImBF_4$ is obtained, this ensuring adsorption of the ionic liquid on the surface of the titanium dioxide and allowing ion exchange between the Li ion and the imidazolium cation. The electrolyte LiFT-$EMImBF_4$ is thus obtained.

Example 8

A lithium battery with the electrolyte LiFT-EMImTFSI was prepared by means of the following procedure:
(a) A disk of metal lithium with a diameter of about 13 mm and thickness of about 0.5 mm is prepared. This disk will form the anode. The anode may also consist of graphite, so that a lithium-ion battery is obtained.
(b) The cathode consists of a tablet formed by powders of $Li_4Ti_5O_{12}$ and graphite in a proportion of 30% and 70% by weight, respectively, to which 10% by weight of polyacrylonitrile is added; the cathode material may also be composed of $LiCoO_2$, $LiNiO_2$, $LiFePO_4$, $LiMn_2O_4$ or $LiMnO_2$.
(c) The electrolyte is composed of LiFT-EMImTFSI obtained according to the process described in Example 6.
(d) The electrolyte is pressed between the two tablets of anode and cathode material so as to form the cylindrical symmetry system shown in FIG. 9.

Figure 10:
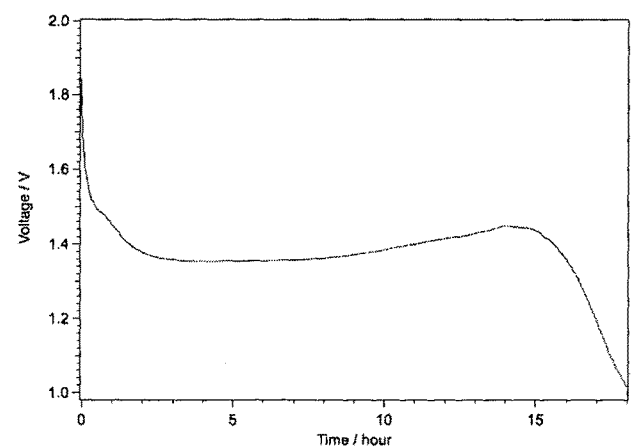

The battery obtained was discharged with a constant current of 500 μA down to the voltage of 1 V; the profile of the first discharge curve is shown in FIG. 10. As can be seen from the Figures, the battery has a capacity of 303 mA h $g^{-1}$ and a discharge plateau around 1.4V.

Example 9

Figure 11:
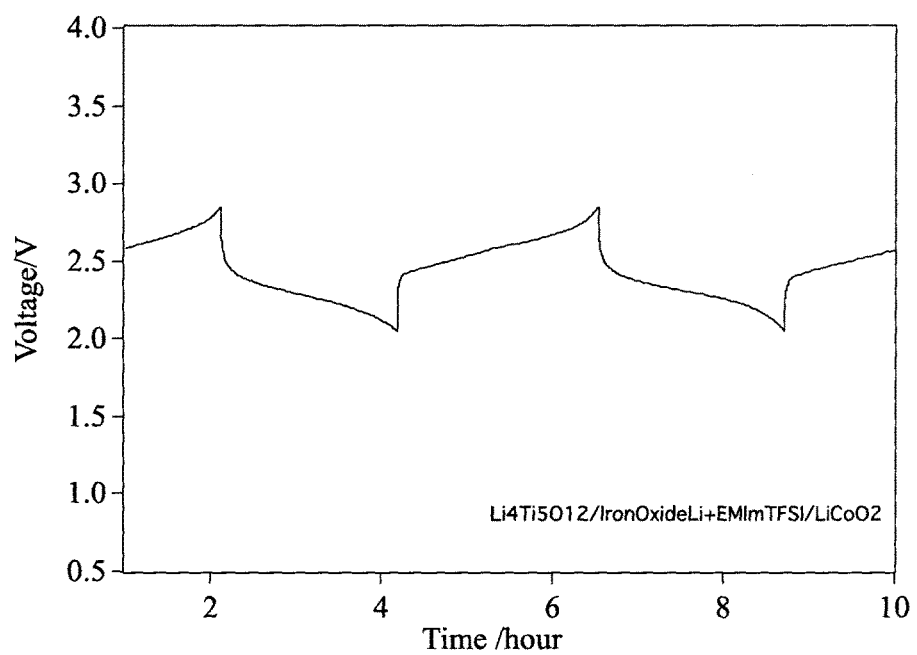

The electrolyte LiFFeO-EMImTFSI is prepared by means of the process shown in Example 6. A lithium battery with the electrolyte LiFT-EMImTFSI was prepared by means of the procedure and the reagents described in Example 8. The electrolyte is pressed between the two tablets of anode and cathode material so as to form the cylindrical symmetry system shown in FIG. 9. The profile of the discharge curves is shown in FIG. 11. The charge and discharge curves are highly reproducible over time with low overvoltages and trends which indicate a very good reversibility of the system. The cell has a discharge plateau centred around 2.3V and charge plateau centred around 2.5V. The charge and discharge cut-off values are 2.95 and 2.05 V, respectively. The battery was cycled with a constant current of 80 μA corresponding to about 100 μA/cm² which is a standard for button batteries of this type. The capacity is equivalent to 81 mAh/g, a value which is slightly less than the theoretical value for $Li_4Ti_5O_{12}$ which is 130 mAh/g.

Example 10

2 g of FT are reacted with a large excess amount of molten Na at 120° C. using an isomantle and with constant mixing. The reaction was performed in a crucible under an argon atmosphere (oxygen and water<1 ppm). FT and molten metal sodium were reacted for 2 hours. The product was thoroughly washed with ethanol. In this way it was possible to functionalize with sodium the fluorinated oxides such as FT.

Example 11

BDS Measurement

A sample of FT obtained using the process described in Example 1, a sample of LiFT obtained using the process described in Example 4 and a sample of LiFT-EMImTFSI obtained using the process described in Example 6 were subjected to Broadband Dielectric Spectroscopy (BDS). For this purpose tablets of said samples with a diameter of between 13 mm and 20 mm and thickness of between 100 micrometers and 500 micrometers were used.

The BDS measurements were performed in the frequency range 10 MHz-7 MHz and in the temperature range −100-155° C., by means of an impedance analyzer coupled to a temperature control system; the analyzer measures the complex impedance $Z^*(\omega)$ of the sample in a wide frequency range and then calculates the complex permittivity and conductivity $\in^*(\omega)$ e $\sigma^*(\omega)$.

The overall conductivity σ of the electrolyte FT or LiFT or LiFT-EMImTFSI is determined by different and specific chemical/physical charge transfer phenomena. In the case of FT and LiFT the conductivity is determined by hopping of $H^+$ or $Li^+$, respectively.

In the ionic liquids (type EMImTFSI) used as electrolytes, the conductivity is determined by different polarization phenomena between the interfaces of the anion and cation clusters of the same ionic liquid, detailed as $\sigma_{p1}$, $\sigma_{p2}$ and $\sigma_{p3}$. In FIG. 8, in the regions III and II (therefore with T>fusion T of EMImTFSI, equal to −10° C.) it can be noted that that the conductivity values attributable to $\sigma_{p1}$, $\sigma_{p2}$ and $\sigma_{p3}$ are greater than the conductivity of LiFT, thus indicating the advantage of using LiFT-EMImTFSI in preference to LiFT alone.

In the region I, with T<−10° C. (EMImTFSI solid) the conductivity $\sigma_{dc}$ of LiFT-EMImTFSI is less than $\sigma_{dc}$ of LiFT, indicating that, in the first compound, transfer of the charge is caused by hopping of the complex $[Li(TFSI)_2]^-$, which is more crowded than $Li^+$.

BRIEF DESCRIPTIONS OF DRAWINGS

Figure 2:
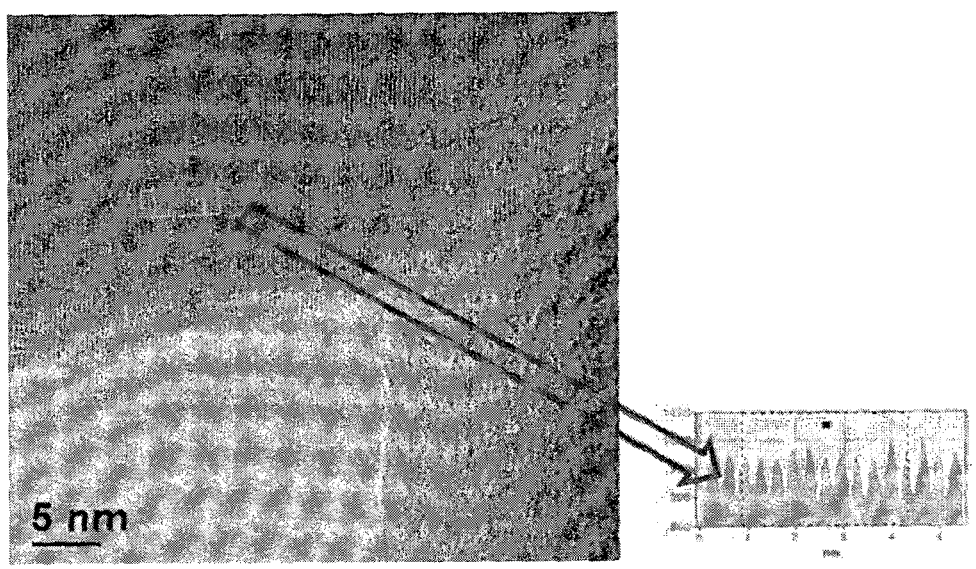

FIGS. 1-2. HR-TEM (High-Resolution Transmission Electron Microscopy) analyses of fluorine-doped titanium dioxide particles in accordance with certain embodiments of the invention.

FIGS. 3-4. Scanning electron microscope (SEM) analyses of fluorine-doped titanium dioxide particles in accordance with certain embodiments of the invention.

Figure 5:
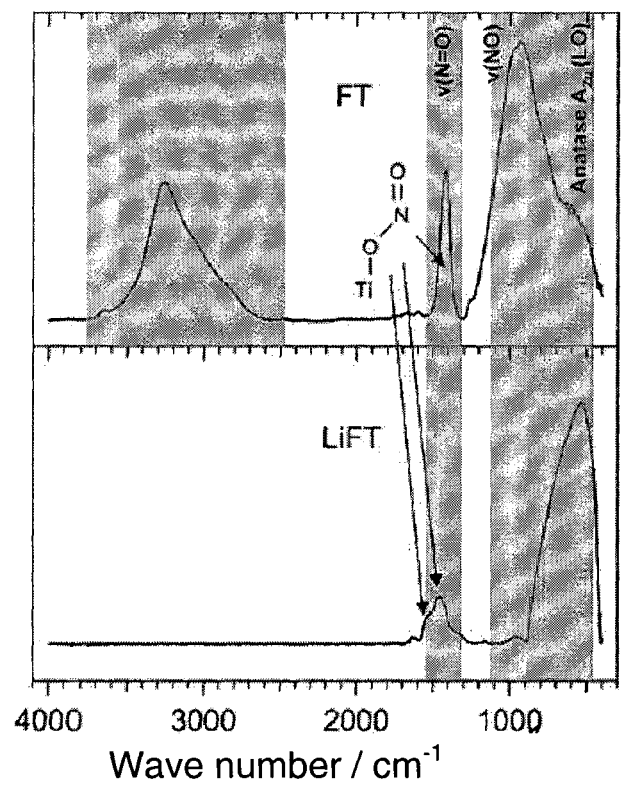

FIG. 5. MIR (mid-infrared) spectrum regarding reaction between fluorine-doped titanium dioxide particles and fused lithium in accordance with certain embodiments of the invention.

FIG. 6. FIR (far infrared) spectrum regarding reaction between fluorine-doped titanium dioxide particles and fused lithium in accordance with certain embodiments of the invention.

FIG. 7. Conductivity graph of LiFT and LiFFeo measured in the temperature range—100 to 150° C. in accordance with certain embodiments of the invention.

FIG. 8. Conductivity graph of FT, LiFT and LiFT-EMImTFSI as obtained from broadband dielectric spectroscopy (BDS) at same temperature in accordance with certain embodiments of the invention.

Figure 9:
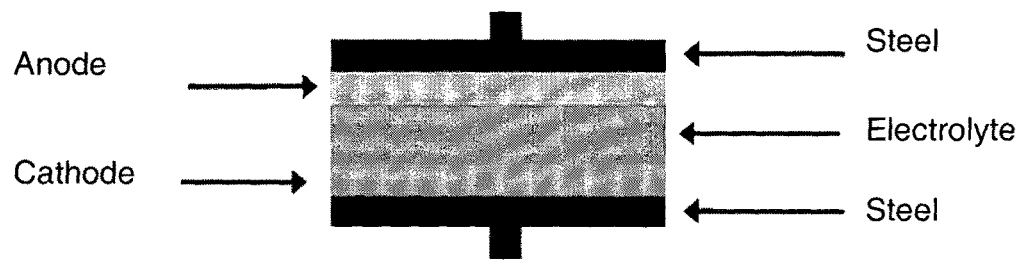

FIG. 9. Cylindrical symmetry system involving electrolyte presses between two tablets of anode and cathode material in accordance with certain embodiments of the invention.

FIG. 10. Discharge curve for Li battery with electrolyte LiFT-EMImTFSI in accordance with certain embodiments of the invention.

FIG. 11. Discharge curve for Li battery with electrolyte LiFFeO-EMImTFSI in accordance with certain embodiments of the invention.

FIG. 12. Scanning electron microscope (SEM) analyses of particles of $Fe_2O_3$ doped with fluorine in accordance with certain embodiments of the invention.

The invention claimed is:

1. A process for preparing a solid-state electrolyte, comprising the steps of:
   (a) providing doped crystalline oxide particles;
   (b) drying the doped crystalline oxide particles at a temperature of at least 90° C. to obtain dried particles;
   (c) reacting the dried particles with molten metal in an amount of between 0.5 and 1000 parts by weight in an inert gas to obtain a mixture;
   (d) cooling the mixture to room temperature to obtain a solid, wherein the solid contains unreacted, excess metal;
   (e) washing the solid with alcohol to remove the unreacted excess metal; and
   (f) drying the solid at a temperature of at least 90° C. to obtain a solid-state electrolyte.

2. The process of claim 1 wherein the step of reacting the dried particles with molten metal comprises reacting the dried particles with molten metal in an amount of between 1 and 50 parts by weight.

3. The process of claim 1 wherein the alcohol is a $C_1$-$C_4$ alcohol.

4. The process of claim 1 wherein the molten metal is lithium.

5. The process of claim 1 wherein the step of reacting the dried particles with molten metal is performed at a temperature of between 200 and 240° C.

6. The process of claim 5 wherein the step of reacting the dried particles with molten metal is performed at a temperature of about 220° C.

7. The process of claim 1 wherein the step of washing the solid with alcohol to remove the unreacted excess metal is performed by washing the solid with 10 to 100 volumes of alcohol per part by weight of the solid.

8. The process of claim 7 wherein the step of washing the solid with alcohol to remove the unreacted excess metal is performed by washing the solid with 10 to 50 volumes of alcohol per part by weight of the solid.

* * * * *